United States Patent [19]

Federici et al.

[11] Patent Number: 5,064,926

[45] Date of Patent: Nov. 12, 1991

[54] WATER-DILUTABLE FLUORINATED POLYURETHANES, PROCESS FOR PREPARING THEM AND THEIR USE FOR THE TREATMENT OF LITHOIDAL MATERIALS AND PLASTERS

[75] Inventors: Franco Federici; Ennio Cozzi, both of Milan; Paolo Parrini, Novara, all of Italy

[73] Assignee: Syremont S.p.A., Milan, Italy

[21] Appl. No.: 607,331

[22] Filed: Oct. 31, 1990

[30] Foreign Application Priority Data

Nov. 30, 1989 [IT] Italy ................................ 22545 A/89

[51] Int. Cl.$^5$ ............................................. C08G 18/10
[52] U.S. Cl. ....................................... 528/49; 528/60; 528/65
[58] Field of Search ............................... 528/49, 60, 65

[56] References Cited

U.S. PATENT DOCUMENTS 4,551,498 11/1985 Yeater et al. ...................... 528/65

Primary Examiner—Maurice J. Welsh
Attorney, Agent, or Firm—Morgan & Finnegan

[57] ABSTRACT

Water-dilutable fluorinated polyurethanes obtained from the reaction of at least one diisocyanate with at least one hydroxy-capped perfluoropolyether having a molecular weight comprised within the range of from 400 to 7000 with at least one polyol with a hydroxy functionality higher than, or equal to, 2, supporting at least one ionizable group and therefore with at least one hydroxy compound with a functionality of at least 1. Use of these products in the treatment of lithoidal products.

19 Claims, No Drawings

5,064,926

WATER-DILUTABLE FLUORINATED POLYURETHANES, PROCESS FOR PREPARING THEM AND THEIR USE FOR THE TREATMENT OF LITHOIDAL MATERIALS AND PLASTERS

FIELD OF THE INVENTION

The present invention relates to water-dilutable fluorinated polyurethanes and to their use for the treatment of lithoidal materials.

More in particular, the present invention relates to water-dilutable fluorinated polyurethanes and to the use thereof in the preparation of protecting compositions endowed with high characteristics of resistance to light, and impermeability to water.

Still more particularly, the present invention relates to water-dilutable fluorinated polyurethanic compositions displaying the features of exerting an energic impermeabilizing action, undrestood as an action of protection against the aggressive action of moisture and water, as well as of the salts dissolved in it, with the permeability of gases and vapours of the treated materials being kept unchanged.

BACKGROUND OF THE INVENTION

The compositions according to the present invention make it possible a sheltering action to be achieved, which is kept unchanged for a very long time, also when the treated material is exposed to drastic environmental conditions of decay and ageing.

It is well-known that many materials tend to decay with time and to become, for example, extremely porous and incoherent, before getting completely destroyed, due to chemical actions performed by the surrounding environment, or owing to also natural causes of decay and ageing. Typical examples of materials which undergo such an action are any kinds and types of stones, such as bricks, marbles, building materials, and so forth.

The problem of the preservation of these materials is of basic importance in those cases in which one wishes to preserve the object or built structure with its original appearance, and replacing it to a more or less integral extent is not desired. This problem arises, e.g., in case of cultural, artistic, historical and archaeological goods, whose inheritance has to be preserved for a time which should be as long as possible.

It is well-known that the materials which are more subject to such effects of intense decay are lithoidal monuments such as churches, palaces, built structures, and so forth, which, by being in continuous contact with the more or less polluted atmosphere of towns and/or of the surrounding environment, undergo continuous attacks by chemical agents, such as sulfur oxides or nitrogen oxides which, in the presence of atmospheric humidity, exert an action which modifies to a substantial extent the nature of the materials they were built with. These chemical attacks, combined with the natural temperature variations, cause changes in colour, or the formation of crusts, scales, thin strips, crevices, and so forth, with the concerned materials consequently undergoing a progressive, continuous and inexorable loss of cohesion, and portions of materials getting lost day after day.

In this case, the intervention aiming at preserving the object or built structure requires a preliminary cleaning and a subsequent step of protective treatment, during which the operators try to protect the various constituting elements or parts, aiming at preventing aggressive agents from attacking the protected object or structure and its more significant portions, such as decorations, relieves, and so forth.

For the purpose of achieving such a protection, it is known to coat or soak the concerned object or structure, or material, with polymeric film-forming substances, such as acrylic, vinylic, siliconic resins, and so forth, showing a good adhesive power, a good resistance to atmospheric agents and a fairly good resistance to ageing due to the action of light and of other atmospheric agents. The main drawback shown by these polymeric substances is that they form a film which, even if is kept very thin, is not permeable to air, vapours and other gases. Such an impermeable coating causes vapours to accumulate inside the material, salts to concentrate and a whole range of processes to take place which may irreparably damage the treated material to an even more evident extent. In fact, it is known that the transpiration of a material, such as stone, brick, marble, and so forth, is of basic importance for the purposes of its correct and long-lived preservation.

In Italian patent application 21018 A/89 it was found that polyurethanes with hydroxy functionality, whose chains contain moieties of perfluoroether nature, are products showing the above said characteristics and which, beside being colourless and having good adhesion properties and optimum characteristics of resistance to light, moisture, water and atmospheric agents, do not substantially modify the permeability to gases and vapours and furthermore show characteristics of being not film-forming and of reversibility.

Unfortunately, it was observed that applications of such products to lithoidal materials with a high moisture content, like stone materials may be immediately after rain, are difficult and usually ineffective, in that the hydrophobic nature of the products constitutes a hindrance to a correct application thereof.

The purpose of the instant invention is of providing a composition for protecting lithoidal materials which, besides being endowed with the above described characteristics, is suitable for being applied onto substrates having a high moisture content.

SUMMARY OF THE INVENTION

Therefore, the subject-matter of the presente invention are water-dilutable fluorinated polyurethanes obtained according to a process which comprises:

i) reacting an excess of at least one organic diisocyanate with at least one hydroxy-capped perfluoropolyether;

ii) reacting the so obtained product with at least one polyol with a hydroxy functionality higher than, or equal to, 2, supporting at least one ionizable group; and iii) reacting the so obtained prepolymer with at least one hydroxy compound having a functionality of at least 1.

DESCRIPTION OF THE INVENTION

According to the present invention, the ratio of NCO equivalents to total OH equivalents [<<CO/(total OH) equivalent ratios>>] are lower than, or equal to, 1, and are preferably comprised within the range of from 0.001 to 0.9.

Any diisocyanates having the general formula:

$$NCO-R_1-NCO \quad (I)$$

wherein $R_1$ is selected from among alkylene, cycloalkylene, alkylene-cycloalkylene or arylene radicals containing from 1 to 20 carbon atoms, can be used in the preparation of the fluorinated polyurethanes according to the present invention. Examples of diisocyanates which can be used are: 2,4-toluene-diisocyanate either alone or in mixture with 2,6-toluene-diisocyanate isomer, 4,4'-diphenylmethanediisocyanate, 4,4'-dicyclohexyl-methanediisocyanate; 1-isocyanato-3-isocyanato-methyl-3,5,5-trimethylcyclohexane (or isophoronediisocyanate); 2,2,4-trimethylhexamethylene-di-isocyanate in mixture with 2,4,4-trimethylhexamethylene-di-isocyanate, ethylidene-di-isocyanate, butylenediisocyanate, pentamethylene-diisocyanate, hexamethylene-diisocyanate, cyclopentylene-1,3-diisocyanate, cyclohexylene-1,4-diiso-cyanate, cyclohexylene-1,2-diisocyanate, xylilene-diiso-cyanate, dichlorohexamethylene-diisocyanate, dicyclohexyl-4,4'-diisocyanate, 1,2-di-(isocyanatomethyl-cyclobutane), 1-methyl-2,4,-diisocyanato-cyclohexane, 1-methyl-2,6-diiso-cyanatocyclohexane, and so forth; aliphatic diisocyanates containing ether groups, such as 1,3-bis-(gamma-isocyanatopropoxy)-2,2-dimethylpropane, and so forth.

Among these, the aliphatic diisocyanates, such as isophorone-diisocyanate are preferred.

The hydroxy-capped perfluoropolyethers used in the preparation of the polyurethanes according to the present invention have an average molecular weight comprised within the range of from 400 to 7000 and have the general formula:

$$OH-Rf-OH \qquad (II)$$

in which the Rf radical can be selected from those having the formula:

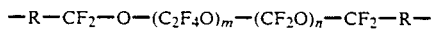

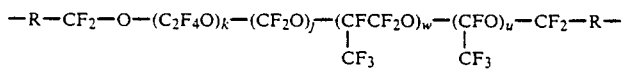

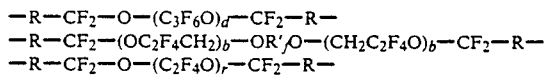

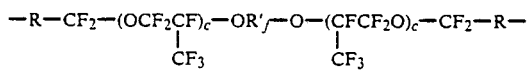

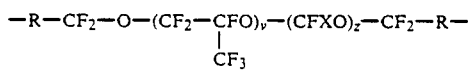

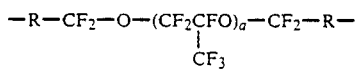

wherein:
R is selected from among:

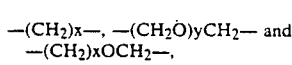

with x and y being integers comprised within the range of from 1 to 4;

m and n are integers whose m/n ratio is comprised within the range of from 0.2 to 2, and preferably of from 0.5 to 1.2;

R'f is a perfluoroalkylene radical,

X is either F or $CF_3$;

k, j, w, u, d, b, r, c, v, z, a, g are integers which enable molecular weights to be obtained, which are comprised within the range of from 400 to 7000.

The perfluoropolyethers of general formula (II) are known products and can be obtained according to the processes disclosed in U.S. Pat. Nos. 3,242,218; 3,665,041; 3,715,378 and 4,523,039 or in published European patent applications Nos. 148,482; 151,877; 165,649 and 165,650, the contents of which constitutes an integrating part of the instant disclosure.

The pefluoropolyethers are known on the market with the trade marks FOMBLIN ® and GALDEN ®, manufactured and traded by Montefluos S.p.A., with registered office at Milan.

In the preparation of the polyurethanes according to the present invention, those polyols can be used as the ionizable polyols, which contain at least one free carboxy group, preferably linked to the same carbon atom which bears the two hydroxy groups; examples of such products are dimethylolacetic acid, dimethylolpropionic acid, dimethylolbutylric acid, and so forth.

Furthermore, also compounds containing two hydroxy groups and one free carboxy group not bonded to the same carbon atom such as, e.g., the semiesters of anhydrides of bicarboxy acids with triols, can be used.

Examples for such compositions are the semiesters of maleic anhydride, succinic anhydride, phthalic anhydride, and so forth, with trimethylolethane, trimethylolpropane, glycerol, and so forth.

Any hydroxylated compounds having a functionality of at least 1 can be used in the synthesis of the polyurethanes according to the present invention. Meaningful examples are the polyols having a molecular weight lower than 500, such as isopropanol, ethyleneglycol, ethyleneglycol monoacetate, propyleneglycol, propyleneglycol monoacetate, 1,4-butanediol, trimethylolpropane, trimethylolethane, glycerol, 1,2,6-hexanetriol, pentaerythritol, neopentylglycol, hydrogenated bisphenol A, and so forth.

The water-dilutable fluorinated polyurethanes according to the present invention have an average molecular weight higher than 1000 and preferably comprised within the range of from 2000 to 10000, a hydroxy functionality higher than, or equal to, 0 and generally comprised within the range of from 2 to 6, a fluorine content larger than 30% by weight, and preferably comprised within the range of from 35 to 60%, a content of ionizable groups of at least 1% by weight, computed on the dry weight of the products, and soluble in most organic solvents such as, e.g., esters, ketones, glycolethers, chlorofluorocarbons and, after salification of the ionizable group, also in water.

For the salification, salifying agents are preferably used which are selected from among the inorganic bases, such as sodium hydroxide or ammonium hydroxide and the tertiary amines or alkanolamines, such as triethylamine, dimethylethanolamine, triethanolamine, and the like.

High-molecular-weight polyols, e.g., with a molecular weight comprised within the range of from 500 to 6000, such as polyethyleneglycol 1000, polyethyleneglycol 2000, polypropyleneglycol 1000, polypropyleneglycol 2000, polytetramethyleneglycol, polycaprolactonediol, etc., and their corresponding derivatives monoesterified with ($C_1$–$C_4$)-alkyl acids can be used as well.

A process for preparing the water-dilutable, fluorinated polyurethanes according to the present invention comprises:

(a) reacting the diisocyanate and the hydroxy-capped perfluoropolyether at a temperature comprised within the range of from 40° to 100° C., with a ratio of NCO equivalents to OH equivalents (<<equivalent NCO-/OH ratio>>) of about 3;

(b) reacting the product from (a) step with the ionizable polyol with functionality higher than, or equal to, 2, at a temperature comprised within the range of from 40° to 120° C., with an equivalent [NCO of (a)]/OH ratio higher than, or equal to, 1.5, and preferably comprised within the range of from 2 to 3; and (c) reacting the product from the (b) step with a hydroxy product with functionality of at least 1, at a temperature comprised within the range of from 50° C. to 120° C., until NCO groups disappear.

The reactions of (a), (b) and (c) steps are preferably carried out in a solvent inert at reaction temperatures; examples of solvents are glycolether acetates, such as methyl-cellosolve acetate, methoxypropanol-acetate, butoxy-ethanol-acetate, and so on, esters, such as ethyl acetate, butyl acetate, etc., N-methylpyrrolidone, and so forth.

In order to increase the reaction rate said reaction should be preferably carried out in the presence of suitable catalysts.

Examples of such catalysts are: tertiary amines, such as triethylenediamine, N-ethyl-ethylene-imine, tetramethyl-guanidine, dimethyl-cyclohexylamine, etc.; the organometallic activators, such as dibutyltindilaurate, tin octanoate, cobalt naphthenate, vanadium acetylacetonate, dimethyltindiethylhexanoate and mixtures thereof.

Triethylenediamine and dibutyltindilaurate are preferred catalysts.

Said catalysts are used in catalytic concentrations, generally not higher than 0.1% by weight.

The water-dilutable fluorinated polyurethanes according to the present invention can be used as sheltering agents in the treatment of lithoidal materials, plasters and cements, to which they give hydrophobic and enhanced cohesion features. The products according to the present invention are preferably used in the form of solutions of high concentrations comprised within the range of from 1 to 20% by weight, and preferably of from 1 to 5%.

As solvents, water of mixtures of water with the same solvents of the preparation procedure, or other water-compatible dilution solvents can be used. Examples of dilution solvents are alcohols, glycolethers, ketones or mixtures thereof.

For the purpose of better understanding the present invention and in order to practice it, some illustrative examples thereof are reported in the following, which in no way shall be construed as being limitative of the scope of protection of the same invention.

EXAMPLE 1

66.69 g of isophoronediisocyanate (0.3 mol), 200 g of Fomblin Z-DOL 2000 (0.1 mol), 66.7 g of methoxypropanol acetate and 0.066 g of DABCO T12 CL (dibutyltindilaurate) are charged under a nitrogen atmosphere to a reactor of 500 cc of capacity equipped with stirrer, thermometer and reflux condenser. The reaction mixture is heated to 55° C. within a 20-minute time, then up to approximately 80° C. within a 15-minute time. The reaction mixture is kept at this temperature until an NCO content of not more than 5%, referred to the dry weight, is reached (solids content=80%). The reaction mixture is then cooled down to 70° C. and 13.4 g of dimethylolpropionic acid is added to it. The reaction mixture is heated to 100° C. within a 30-minute time, and is kept at this temperature until an NCO content comprised within the range of from 2.4 to 3.6, as referred to the total reaction mixture, is reached. The reaction mixture is cooled down to 70° C. and 21.84 g of neopentylglycol is added to it. The resulting reaction mixture is heated to 80° C. within a 30-minute time and is kept at this temperature until the presence of NCO groups can no longer be demonstrated (2.5 hours).

The reaction mass is cooled down to 70° C. and to it 10.1 g of triethylamine and 245.3 g of water is added; an end product with a solids content of 50% is obtained.

EXAMPLE 2

The process is carried out in the same way as of Example 1, until the second content of NCO groups is reached. The reaction mass is then cooled down to 55° C. and about 18.45 g of 1,4-butanediol (0.205 mol) is added to it. The temperature is then increased up to about 100° C. during a 2.5-hour time. The reaction mass is kept at this temperature until NCO groups totally disappear (after about 1 hour). The composition is then diluted with water according to the same modalities as of Example 1.

EXAMPLE 3

The process is carried out in the same way as of Example 1, with neopentylglycol being replaced by 12.5 g of isopropanol.

The chemical-physical characteristics of the products obtained from Examples 1-3 are reported in following Table 1.

TABLE 1

| Characteristics | Example 1 | Example 2 | Example 4 |
| --- | --- | --- | --- |
| Appearance | * | * | * |
| Measured residual solids % | 50 | 50 | 50 |
| Viscosity. mPa.s at 23° C., 2400 | 240 | 150 | 200 |
| Hydroxy fuctionality | 2 | 2 | — |
| Solvent | PMA/water | PMA/water | PMA/water |
| Resistance to U.V. C (wavelength 253 nm), $\Delta E$ after 400 hrs of exposure (ASTM D 2244-79 Scale B2) | 0.3 | 0.4 | 0.3 |
| Contact angle (Aticelca MC 21-72) | 104° | 105° | 103° |
| Polyurethane fluorine content referred to dry weight, % | 40 | 40 | 40 |

* = slightly cloudy liquid
PMA = Methoxypropanol acetate

EXAMPLE 4

The product of Example 1 was used for tests of strengthening and hydrophobization of surfaces of an aged plaster composed by air-hardening lime and sand in the mutual ratio of 2:1, which had been installed on the relevant wall at least 50 years before the test. Said plaster showed loosened portions and poorly coherent and strongly moist surface areas.

The average water absorption is of 14.5% by weight/weight.

Surfaces of 0.15×0.6 m were treated with a solution of the product of Example 1 salified with diluted ammonium hydroxide at 2.5% by weight/weight in 3:1 water-/ethyl alcohol.

The so prepared solution was applied by brush, so as to have 6 adjacent regions with regular boundaries, treated with an increasing number of layers.

The waterproofing power was evaluated by comparing the drying speeds of the six treated regions, after being treated with plentiful water.

After 5 minutes all of the regions treated with three or more layers resulted to be dry. After 16 minutes, all treated areas resulted to be dry, differently from the surrounding—not treated—areas, which resulted to be wet even after 60 minutes.

The strengthening power was verified by submitting a surface element of about 100 cm² of surface-area to 10 brush strokes with a hard-bristle brush, and collecting the removed material. The amount of material removed from the not treated surface region was of about 2.5 g, while the material removed from the regions treated with 1 layer was of 2.1 g, and the amount removed from the regions treated with at least 3 layers was of less than 0.2 g.

The permeability to water vapour was measured according to ASTM E 96 and the following results were obtained:

11.6 g/hour.m² for non-treated plaster;
7 g/hour.m² for treated plaster.

EXAMPLE 5

The product of Example 1, salified with an excess of triethanolamine (the double of the stoichiometric amount) in solution at 5% in 3:1 water/ethanol was applied by brush along an edge of a reinforced concrete pillar installed approximately 20 years before the test and exposed to the action of driving rain in an industrial area.

The surface resulted to lack the smooth external layer of cement, with the inert fillers exposed, and displayed friability.

The solution, prepared as disclosed above, was applied by brush, in such a way to have eventually 6 adjacent regions with regular boundaries, treated with a increasing number of layers.

The hydrophobization was evaluated by observing the drying speed of the surface of the treated region, as compared to the drying speed of the surrounding, not treated region; both regions were sprinkled with plentiful water.

The regions with 5 or 6 deposited layers resulted to be poorly wetted, and dried within less than 5 minutes. All of the other treated regions were dry within a time of about 20 minutes, while the non-treated regions were still wet to a visible extent after about 70 minutes.

In the following Table the deposited amounts of product of Example 1 in the various treated regions are reported. Furthermore, as values indicative of the reaggregating power, the amounts of surface material are reported, which can be removed by brushing from each treated region, expressed as percent values referred to the analogous amounts which can be removed from the adjacent, not treated regions.

| | Treatment regions Number of layers | | | | | | |
| --- | --- | --- | --- | --- | --- | --- | --- |
| | 0 | 1 | 2 | 3 | 4 | 5 | 6 |
| Deposit, g/m² | 0 | 18 | 37 | 54 | 69 | 83 | 97 |
| Removable amount of surface material, %: | | | | | | | |
| east side | 100 | 45 | 21 | 17 | 10 | 10 | 10 |
| north side | 100 | 31 | 30 | 30 | 10 | 10 | 10 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Water-dilutable fluorinated polyurethanes obtained according to a process which comprises:
   i) reacting an excess of at least one organic diisocyanate with at least one hydroxy-capped perfluoropolyether;

ii) reacting the so obtained product with at least one polyol with a hydroxy functionality higher than or equal to, 2, supporting at least one ionizable group; and iii) reacting the so obtained prepolymer with at least one hydroxy compound having a functionality of at least 1.

2. Polyurethanes according to claim 1, wherein the ratios of the equivalents of NCO to total equivalents of OH, equivalent NCO/(total OH) ratios are lower than, or equal to, 1.

3. Polyurethanes according to claim 1, wherein the diisocyanate is selected from among those of formula:

$$NCO-R_1-NCO \qquad (I)$$

wherein $R_1$ is selected from among alkylene, cycloalkylene, alkylene-cycloalkylene or arylene radicals containing from 1 to 20 carbon atoms.

4. Polyurethanes according to claim 1, wherein the hydroxy-capped perfluoropolyethers have an average molecular weight within the range of from 400 to 7000 and have the formula:

$$OH-Rf-OH \qquad (II)$$

in which the Rf radical can be selected from those having the formula:

$$-R-CF_2-O-(C_2F_4O)_m-(CF_2O)_n-CF_2-R-$$

$$-R-CF_2-O-(C_2F_4O)_k-(CF_2O)_j-(CFCF_2O)_w-(CFO)_u-CF_2-R-$$
$$\qquad\qquad\qquad\qquad\qquad\qquad | \qquad\qquad |$$
$$\qquad\qquad\qquad\qquad\qquad\qquad CF_3 \qquad\quad CF_3$$

$$-R-CF_2-O-(C_3F_6O)_d-CF_2-R-$$
$$-R-CF_2-(OC_2F_4CH_2)_b-OR'_f-O-(CH_2C_2F_4O)_b-CF_2-R-$$
$$-R-CF_2-O-(C_2F_4O)_r-CF_2-R-$$

$$-R-CF_2-(OCF_2CF)_c-OR'_f-O-(CFCF_2O)_c-CF_2-R-$$
$$\qquad\qquad\qquad | \qquad\qquad\qquad\qquad |$$
$$\qquad\qquad\qquad CF_3 \qquad\qquad\qquad\quad CF_3$$

$$-R-CF_2-O-(CF_2-CFO)_v-(CFXO)_z-CF_2-R-$$
$$\qquad\qquad\qquad\qquad |$$
$$\qquad\qquad\qquad\qquad CF_3$$

$$-R-CF_2-O-(CF_2CFO)_a-CF_2-R-$$
$$\qquad\qquad\qquad |$$
$$\qquad\qquad\qquad CF_3$$

$$-R-CF_2-(OCF_2CF_2CH_2)_g-O-CF_2-R-$$

wherein:
R is selected from among:

$-(CH_2)_x-$, $-(CH_2O)_yCH_2-$ and
$-(CH_2)_xOCH_2-$, with x and y being integers within the range of from 1 to 4;
m and n are integers whose m/n ratio is within the range of from 0.2 to 2;
R'f is a perfluoroalkylene radical,
X is either F or $CF_3$;
k, j, w, u, d, b, r, c, v, z, a, g are integers which enable molecular weights to be obtained, which are within the range of from 400 to 7000.

5. Polyurethanes according to claim 1, wherein the ionizable polyols are those which contain at least one free carboxy group.

6. Polyurethanes according to claim 1, wherein the hydroxy product having a functionality of at least 1 has a molecular weight lower than 500.

7. Polyurethanes according to claim 1, wherein the hydroxy product having a functionality of at least 1 has a molecular weight within the range of from 500 to 6000.

8. Polyurethanes according to claim 1, comprising an average molecular weight greater than 1000, a hydroxy functionality greater than, or equal to, 0, a fluorine content greater than 30% by weight, a content of ionizable groups of at least 1% by weight, computed on the dry substance weight, and soluble in most organic solvents and, after salification of the ionizable group, also in water.

9. Process for preparing the water-dilutable, fluorinated polyurethanes according to claim 1, comprising:
   (a) reacting the diisocyanate and the hydroxy-capped perfluoropolyether at a temperature within the range of from 40° to 100° C., with a ratio of NCO equivalents to OH equivalents, equivalent NCO/OH ratio, of about 3;
   (b) reacting the product from the (a) step with the ionizable polyol with functionality greater than, or equal to, 2, at a temperature within the range of from 40° to 120° C., with an equivalent (NCO of (a))/OH ratio greater than, or equal to, 1.5, and preferably comprised within the range of from 3 to 6; and
   (c) reacting the product from the (b) step with a hydroxy product with functionality of at least 1, at a temperature within the range of from 50° C. to 120° C., until NCO groups disappear.

10. Method of using water-dilutable fluorinated polyurethanes according to claim 1, as protecting agents in the treatment of lithoidal materials, plasters and cements.

11. Method according to claim 10, wherein the polyurethanes are used in the form of a solution with a concentration within the range of from 1 to 20% by weight.

12. Polyurethanes according to claim 2, wherein the ratios of the equivalents of NCO to total equivalents of OH are within the range of from 0.001 to 0.9.

13. Polyurethanes according to claim 4, wherein the m/n ratio is within the range of from 0.5 to 1.2.

14. Polyurethanes according to claim 5, wherein the free carboxy group is linked to the same carbon atoms which bears the two hydroxy groups.

15. Polyurethanes according to claim 8, wherein the polyurethanes have an average molecular weight within the range of from 2,000 to 10,000.

16. Polyurethanes according to claim 8, wherein the hydroxy functionality is within the range of from 2 to 6.

17. Polyurethanes according to claim 8, wherein the fluorine content is within the range of from 35 to 50%.

18. Polyurethanes according to claim 9, wherein the (NCO of (a))/OH ratio is within the range of from 2 to 3.

19. Polyurethanes according to claim 11, wherein the concentration is within the range of from 1 to 5%.

* * * * *